Nov. 27, 1934.   R. O. ALLEN   1,982,278

IMPLEMENT RETAINER

Filed July 11, 1934

INVENTOR.
Roy O. Allen.
BY
HIS ATTORNEY

Patented Nov. 27, 1934

1,982,278

UNITED STATES PATENT OFFICE 1,982,278

IMPLEMENT RETAINER

Roy O. Allen, Athens, Pa., assignor to Ingersoll-Rand Company, Jersey City, N. J., a corporation of New Jersey Application July 11, 1934, Serial No. 734,658

3 Claims. (Cl. 121—32)

This invention relates to a retaining device, and more particularly to an implement retainer adapted to be attached to the cylinder of a pneumatic tool for preventing ejection of the working implement from the tool.

One object of the invention is to enable the retainer to be readily attached to and detached from the tool and with a minimum of distortion of the retainer.

Other objects will be in part obvious and in part pointed out hereinafter.

Figure 1:
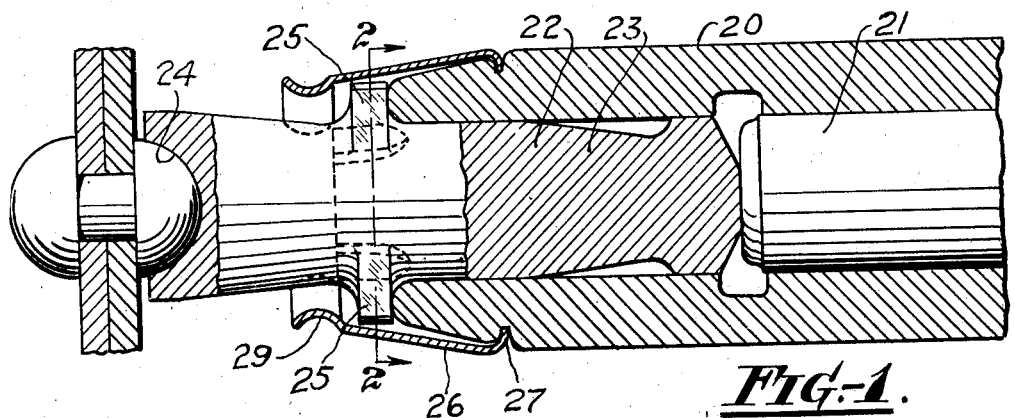
Figure 2:
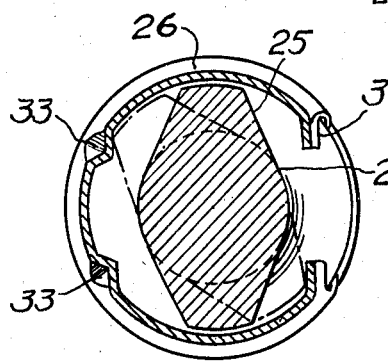
Figure 3:
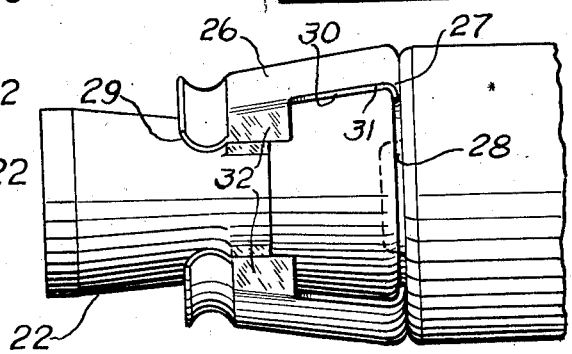
Figure 4:
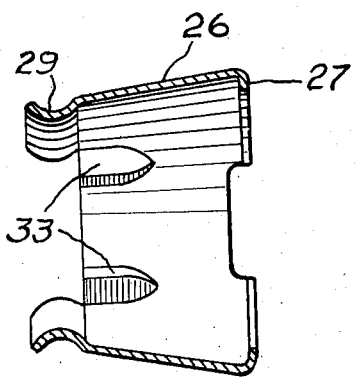

In the drawing accompanying this specification and in which similar reference numerals refer to similar parts, Figure 1 is a longitudinal view, in section, of the retainer and a portion of a pneumatic tool to which it is applied, Figure 2 is a transverse view taken through Figure 1 on the line 2—2, Figure 3 is a side elevation of the retainer, and Figure 4 is a longitudinal view, in section, of the retainer.

Referring more particularly to the drawing, 20 designates the cylinder of a pneumatic tool and 21 a hammer piston reciprocable in the cylinder for actuating a working implement, shown as a rivet set 22, having its stem 23 extending slidably into the cylinder 20.

In the front end of the rivet set 22 is a concave socket 24 to engage and form the end of a rivet, and intermediate the ends of the rivet set are a pair of lateral lugs 25 which are disposed on diametrically opposite sides of the rivet set and are adapted to abut the front end of the cylinder 20 to limit the distance which the rivet set may extend into the cylinder.

In accordance with the present invention the pneumatic tool is provided with a retainer 26 for preventing ejection of the rivet set 22 upon impact of the piston 21 thereagainst. The retainer is in the form of a sleeve, preferably of frusto-conical shape and constructed of spring material, and has a flange 27 at the end of larger diameter to engage an external annular groove 28 in the cylinder. On the opposite or front end of the retainer is a shoulder 29 in the form of a bead curved inwardly toward the rivet set to lie, in the assembled position of the retainer on the cylinder, forwardly of the lugs 25.

In the side of the retainer 26 is an opening 30 which extends from one end of the retainer to the other. The portion 31 of the opening 30 adjacent the flange 27 is of slightly less width than the diameter of the groove 28 so that a substantial area of contact may be maintained between the flange and the cylinder while at the same time avoiding the necessity of widely spreading the retainer in order to attach it or remove it from the cylinder.

In a retainer such as that illustrated, and in such instances as where the retainer and rivet set are capable of free rotation with respect to the cylinder, it is essential that relative rotation between the retainer and the rivet set be limited to the extent that the lugs 25 may not move into registry with the opening 30. To this end the retainer 26 is provided with clips 32 along the edges of the opening 30 and adjacent the shoulder 29 so that, in the assembled position of the retainer on the cylinder, the clips will lie in the same transverse plane as the lugs 25 for which they serve as abutments. Additional abutments 33 are provided for the opposite sides of the lugs 25. The abutments 33 are in the nature of longitudinally extending corrugations in the retainer and may be formed by crimping the retainer inwardly at suitably located points. The abutments 33 may be of substantially the same length as the clips 32 and lie in the same transverse plane as the clips.

In practice, after the rivet set 22 has been inserted in the cylinder 20 the retainer 26 is spread sufficiently to permit entrance of the flange 27 into the groove 28. The retainer need be spread or unfolded only slightly to permit the passage of the flange 27 over the portion of the cylinder defining the groove 28. Being constructed of spring material the retainer will, by reason of its inherent resiliency, remain in snug engagement with the cylinder and its connection therewith will not be disturbed by blows of the lugs 25 against the shoulder 29. In the assembled position of the retainer and the rivet set the clips 32 lie on the same side of the lugs and the abutments 33 will, therefore, lie on the opposite sides of the lugs.

The abutments and the clips are suitably spaced so that during the manipulation of the apparatus the rivet set may rotate freely with respect to the cylinder, as is customary. Likewise, the retainer may rotate with respect to the cylinder but the rivet set and the retainer are capable of only limited rotation with respect to each other. Upon rotating the tool or the rivet set the lugs 25 will engage the clips 32 and the abutments 33 and will thereby be prevented from moving into registry with the opening 30.

I claim:

1. In an implement retainer, the combination of a cylinder and a working implement in the cylinder having a lug, a longitudinally split sleeve constructed of spring material and having a flange to engage the cylinder, a shoulder on the sleeve extending into the path of the lug to prevent ejection of the working implement from the cylinder, and projections on the sleeve located on the opposite sides of the lug to limit relative rotative movement between the sleeve and the working implement.

2. In an implement retainer, the combination of a cylinder and a working implement in the cylinder having a lug lying exteriorly of the cylinder, a sleeve constructed of spring material and having a flange to engage the cylinder, said sleeve having an opening in the side extending along the entire length of the sleeve, a shoulder on the sleeve extending into the path of the lug to prevent ejection of the working implement from the cylinder, and clips at the edges of the opening to prevent the lug from moving into registry with the opening upon rotation of the working implement with respect to the sleeve.

3. In an implement retainer, the combination of a cylinder and a working implement in the cylinder having a lug lying exteriorly of the cylinder, a sleeve constructed of spring material and having a flange to engage the cylinder, said sleeve having a wide opening in the side extending along its entire length, a shoulder on the sleeve serving as an abutment for the lug to retain the working implement in the cylinder, clips at the edges of the opening to prevent the lug from moving into registry with the opening upon rotation of the working implement with respect to the sleeve, and a projection on the inner surface of the sleeve serving as an abutment for the lug to limit the degree of rotative movement of the working implement with respect to the sleeve.

ROY O. ALLEN.